(12) United States Patent
Maezawa et al.

(10) Patent No.: US 7,854,281 B2
(45) Date of Patent: Dec. 21, 2010

(54) PTO CLUTCH FOR WORK VEHICLE AND OPERATING APPARATUS FOR SAME

(75) Inventors: Kiyoshige Maezawa, Kishiwada (JP); Akifumi Nishino, Sakai (JP); Kenzo Ushiro, Sakai (JP)

(73) Assignee: Kubota Corporation, Osaka (JP)

( * ) Notice: Subject to any disclaimer, the term of this patent is extended or adjusted under 35 U.S.C. 154(b) by 798 days.

(21) Appl. No.: 11/708,648

(22) Filed: Feb. 20, 2007

(65) Prior Publication Data

US 2007/0227849 A1 Oct. 4, 2007

(30) Foreign Application Priority Data

Mar. 30, 2006 (JP) ............... 2006-094070
Mar. 31, 2006 (JP) ............... 2006-097738

(51) Int. Cl.
*B60K 17/28* (2006.01)
(52) U.S. Cl. ......................... 180/53.6; 74/11
(58) Field of Classification Search ..... 180/53.6–53.62; 192/14; 74/11, 15.4, 15.82, 473.21
See application file for complete search history.

(56) References Cited

U.S. PATENT DOCUMENTS 5,947,218 A * 9/1999 Ishimaru .................... 180/53.1
6,003,391 A 12/1999 Kojima et al.
2005/0204843 A1 * 9/2005 Nishino et al. ................ 74/331

FOREIGN PATENT DOCUMENTS

JP 2005083488 3/2005

* cited by examiner

*Primary Examiner*—Paul N Dickson
*Assistant Examiner*—Timothy D Wilhelm
(74) *Attorney, Agent, or Firm*—The Webb Law Firm

(57) ABSTRACT

A PTO clutch for a work vehicle and an operating structure for the PTO clutch includes:
  a PTO clutch having a clutch member and receiving drive power from an engine;
  a clutch control mechanically coupled to the clutch member for manually operating the PTO clutch via the clutch member;
  a PTO brake disposed downstream of the PTO clutch with respect to a direction in which power is transmitted, the PTO brake being movable to a braking position in association with a clutch disengaging operation of the clutch member; and
  a control retaining device for retaining the clutch control at a clutch disengaging position.

7 Claims, 9 Drawing Sheets

PTO CLUTCH FOR WORK VEHICLE AND OPERATING APPARATUS FOR SAME

BACKGROUND OF THE INVENTION

The present invention relates to an operating apparatus for a PTO clutch mounted in a work vehicle such as an agricultural tractor.

A PTO clutch operating structure for an agricultural tractor is disclosed in e.g. JP2005-83488. In this construction, a PTO brake is arranged downstream (with respect to power transmitting direction) of a multi-disc type PTO clutch which is hydraulically operated. The PTO brake is operable for a braking operation, in association with a movement of a clutch operating piston member included in the PTO clutch in a clutch disengaging direction, thereby preventing continued inertial rotation of a utility implement which has been cut off from the PTO power transmission.

The above PTO clutch operating structure provides powerful clutch operations and braking operations by the hydraulic force. This construction, however, requires such hydraulic components as clutch operating switching valves, oil conduits, etc. Hence, the construction tends to be complicated and costly.

SUMMARY OF THE INVENTION

The present invention has been made in view of the above-described state of the art.

According to the present invention, there is proposed A PTO clutch for a work vehicle and an operating structure for the PTO clutch, comprising:

a PTO clutch having a clutch member and receiving drive power from an engine;

a clutch control mechanically coupled to the clutch member for manually operating the PTO clutch via the clutch member;

a PTO brake disposed downstream of the PTO clutch with respect to a direction in which power is transmitted, the PTO brake being movable to a braking position in association with a clutch disengaging operation of the clutch member; and control retaining means for retaining the clutch control at a clutch disengaging position.

With the above-described construction, by disengaging the clutch control mechanically coupled to the clutch member and retaining the control at this position, it is possible to keep applying a braking force to a portion, downstream of the PTO clutch, in the PTO transmission line cut off from the power transmission, so that the continued inertial rotation of the PTO power-driven implement after the clutch disengagement can be avoided in a reliable manner.

DETAILED DESCRIPTION OF PREFERRED EMBODIMENTS

Preferred embodiments of the invention will be described next with reference to the accompanying drawings.

Figure 1:
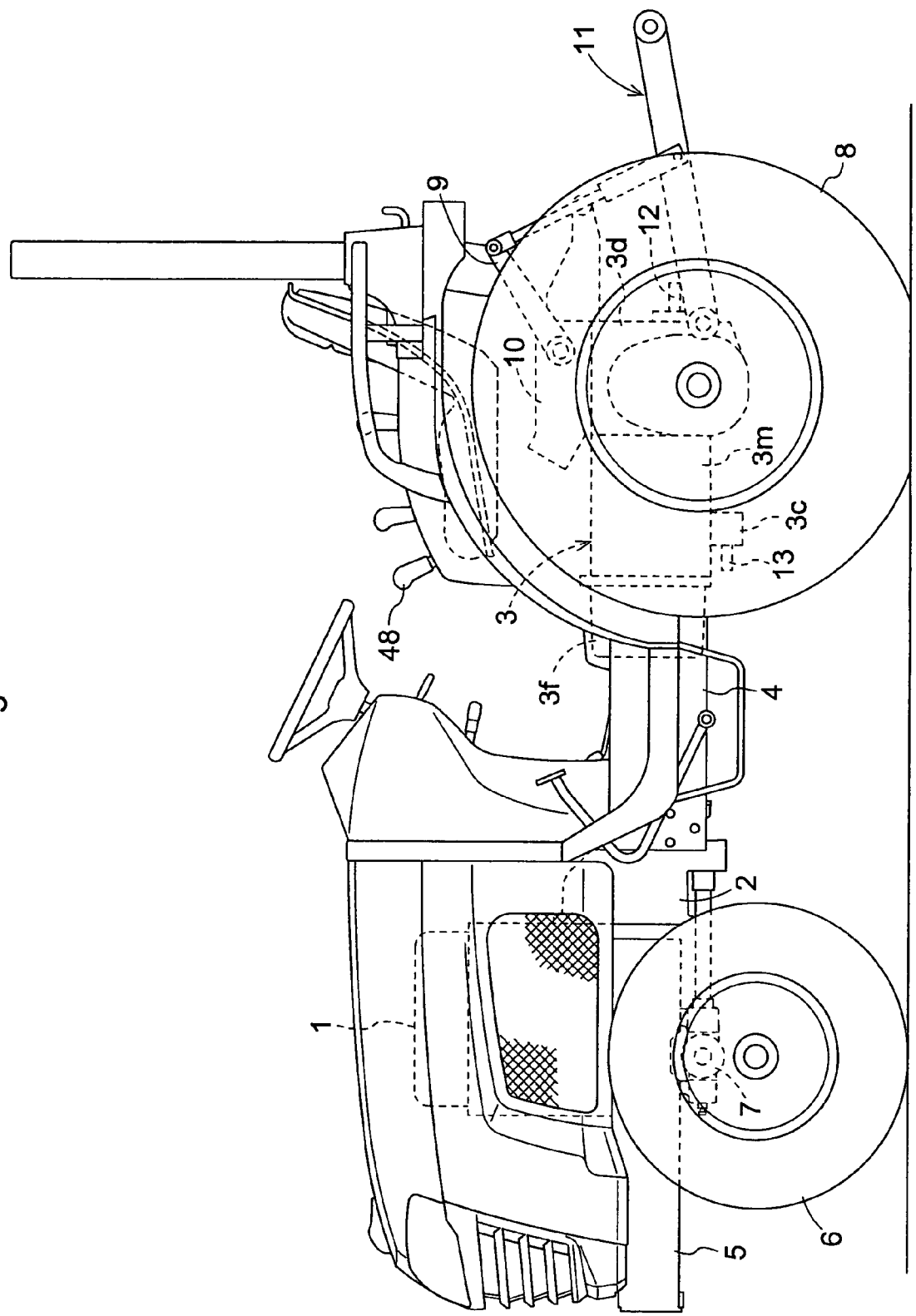
FIG. 1 is a general side view of a tractor.

FIG. 1 shows a general side view of a four-wheel-driven agricultural tractor as an example of a work vehicle. In this agricultural tractor, for forming a vehicle body thereof, a clutch housing 2 connected to a rear side of an engine 1 and a transmission case 3 are connected to each other via a housing frame 4 made of sheet metal. A front frame 5 extending forwardly from a lower side of the engine 1 supports a front axle case 7 mounting steering front wheels 6, with allowing rolling action of the front axle case 7 relative thereto. Rear wheels 8 are mounted at a rear portion of the transmission case 3.

The transmission case 3 is formed by connecting a front case 3$f$, a mid case 3$m$ and a differential case 3$d$ to each other. The rear wheels 8 are rotatably supported to the right and left sides of the differential case 3$d$. To an upper portion of the differential case 3$d$, there is connected a cylinder case 10 carrying lift arms 9. The lift arms 9 are hydraulically driven to lift up/down a three-point link mechanism 11 provided for coupling of an implement. From a rear face of the differential case 3$d$, a rear PTO shaft 12 projects rearwardly. From a lower portion side of the mid case 3$m$, a mid PTO shaft 13 is disposed to project forwardly.

Figure 2:
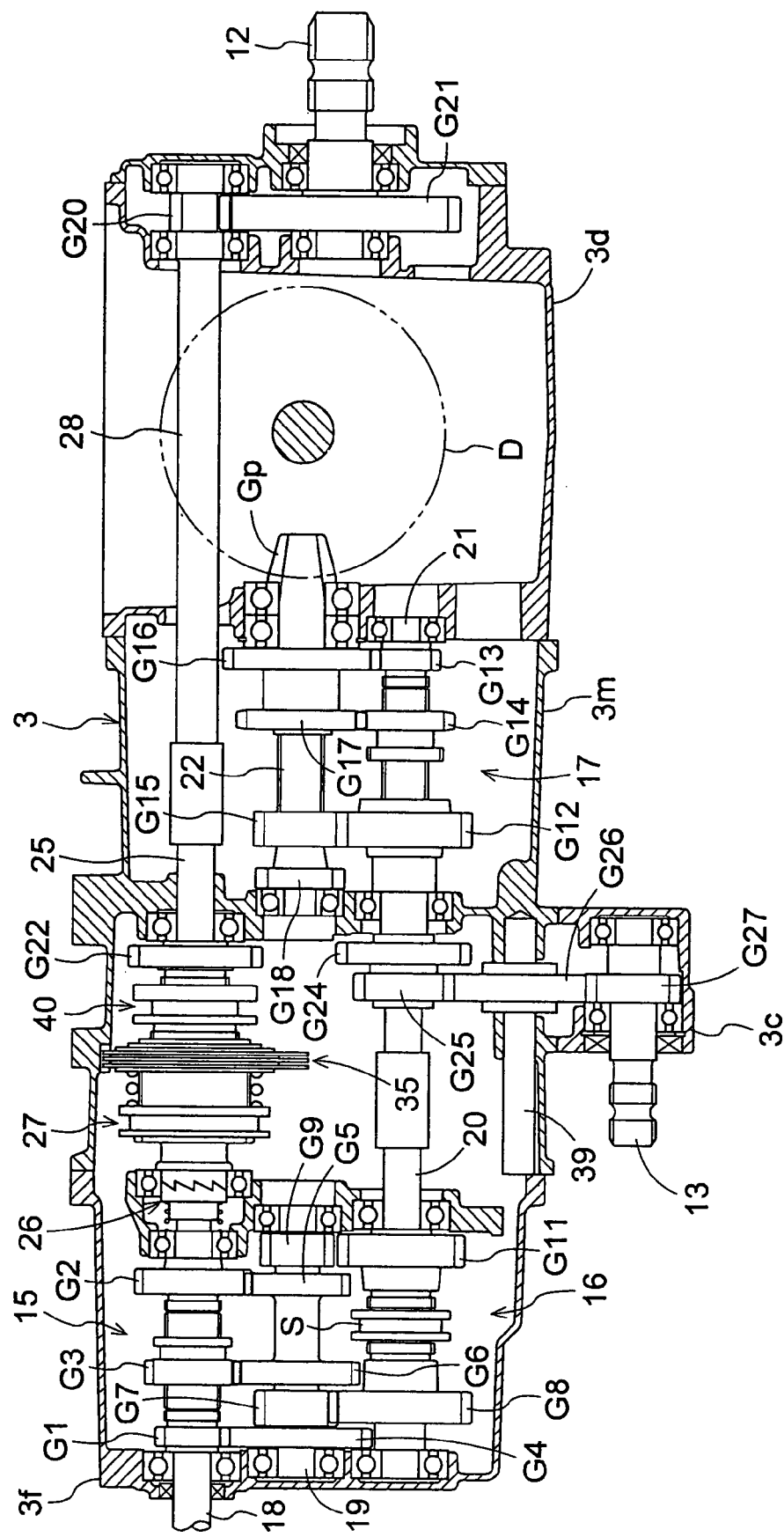
FIG. 2 is a side view in vertical section showing a transmission construction.
Figure 3:
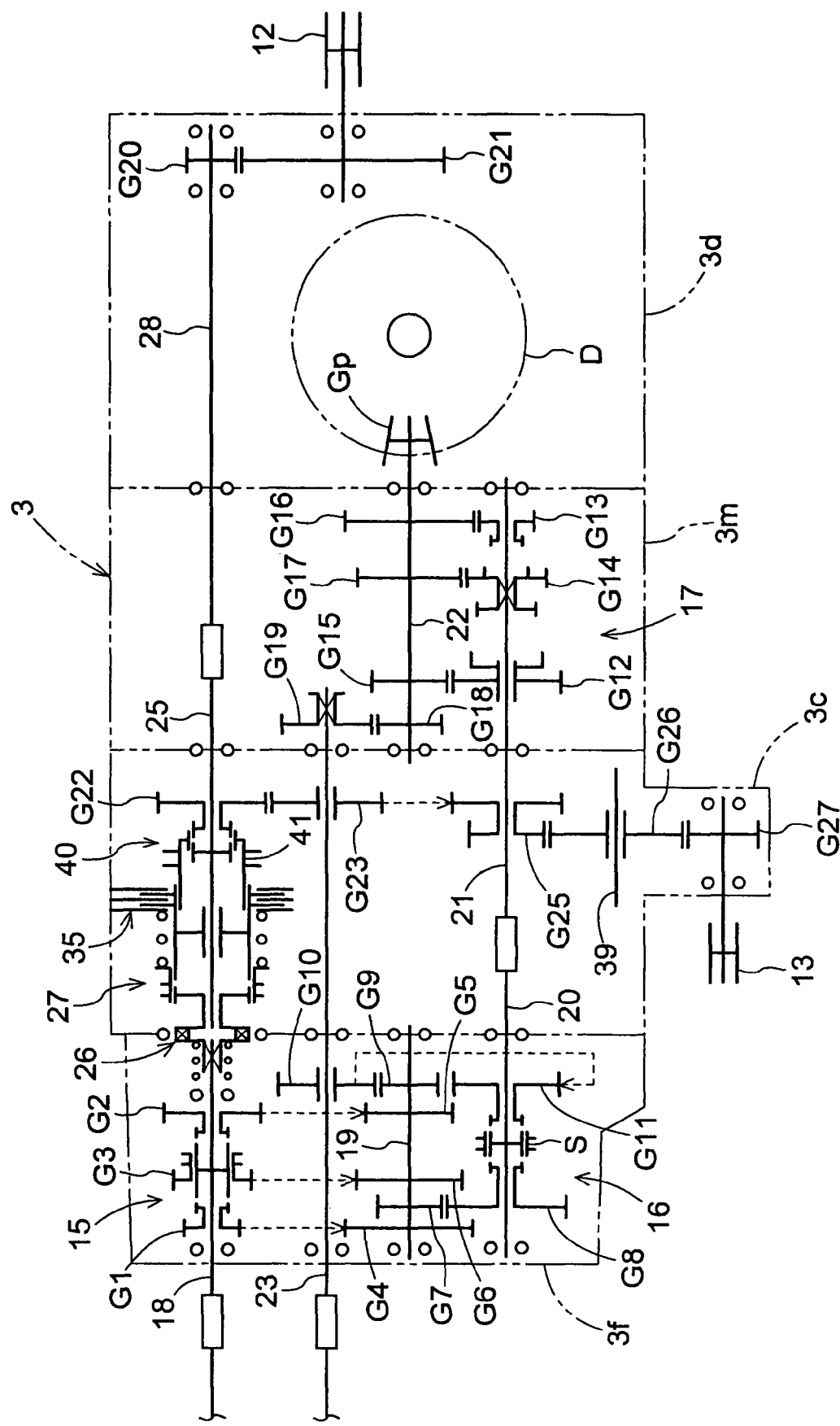
FIG. 3 is a side view showing a gear train included in the transmission construction.

As shown in FIG. 2, the front case 3$f$ accommodates therein a main gear speed-changing section 15 and a forward/reverse switchover section 16. The mid case 3$m$ accommodates therein an auxiliary gear speed-changing section 17.

The main gear speed-changing section 15 is configured to vary the engine power inputted to an input shaft 18 in three speed stages and transmits thus speed-changed power to an intermediate shaft 19. The forward/reverse switchover section 16 is configured to convert the speed-changed power from the intermediate shaft 19 into a forward or reverse rotational power and transmits this to an output shaft 20. Hence, within the front case 3$f$, it is possible to effect main speed changing operations in three forward stages and three reverse stages altogether.

More particularly, the input shaft 18 of the main gear speed-changing section 15 mounts a small free gear G1 and a large free gear G2, and a shift gear G3 having an intermediate diameter is splined between the small and large free gears G1, G2. The intermediate shaft 19 fixedly mounts a large gear G4 and a small gear G5 which constantly mesh respectively with the small, free gear G1 and the large free gear G2 and mounts also an intermediate diameter gear G6. In operation, when the shift gear G3 is shifted forwardly to be spline-engaged with a boss portion of the small free gear G1, power is transmitted at a low speed (first speed) to the intermediate shaft 19 via the small free gear G1 and the large gear G4. When the shift gear G3 is shifted to a fore-and-aft intermediate position to be directly meshed with the intermediate gear G5, power is transmitted at a middle speed (second speed) to the intermediate shaft 19. When the shift gear G3 is shifted rearwardly to be spline-engaged with a boss portion of the large free gear G2, power is transmitted at a high speed (three speed) to the intermediate shaft 19 via the large free gear G2 and the small gear G5.

The output shaft 20 mounts a forward rotation transmitting, free gear G8 constantly meshed with a gear G7 of the intermediate shaft 19 and a reverse rotation transmitting, free gear G11 constantly meshed and operatively coupled with a further gear G9 of the intermediate shaft 19. Also, a shift sleeve S is splined on this output shaft 20. In operation, as the shift sleeve S is shifted to be selectively meshed with either a boss portion of the forward rotation transmitting free gear G8 or a boss portion of the reverse rotation transmitting free gear G11, the speed-changed power of the intermediate shaft 19 is transmitted in forward or reverse rotation to the output shaft 20.

The auxiliary speed-changing section 17 effects speed changing operations in three stages between a transmission shaft (traveling transmission shaft) 21 connected end-to-end abutment with the output shaft 20 and an output shaft (bevel pinion shaft) 22, so that a differential mechanism D is driven via a bevel pinion gear Gp mounted on a rear end of the output shaft 22 so as to drive the right and left rear wheels 8 differentially.

More particularly, the transmission shaft 21 mounts a large free gear G12 and a small free gear G13 at front and rear portions thereof, respectively. Further, a shift gear G14 shiftable between the large and small free gears G12, 13 is splined on this transmission shaft 21. The bevel pinion shaft 22 fixedly mounts thereon a small gear G15 constantly meshed with the large free gear G12, a large gear G16 constantly meshed with the small free gear G13, and an intermediate diameter gear G17 which can be directly meshed with the shift gear G14. In operation, when the shift gear G14 is shifted rearwardly to bring its boss portion into meshed coupling with a boss portion of the small free gear G13, there is realized a "low speed" by the transmission with a gear ratio between the small free gear G13 and the large gear G16. When the shift gear G14 is shifted to a fore-and-aft intermediate position to be directly meshed with the intermediate diameter gear G17, there is realized an "intermediate speed" by the transmission with a gear ratio between the shift gear G14 and the intermediate diameter gear G17. When the shift gear G14 is shifted forwardly to bring its boss portion into meshed coupling with a boss portion of the large free gear G12, there is realized a "high speed" by the transmission with a gear ratio between the large free gear G12 and the small gear G15.

At the front end of the bevel pinion shaft 22 which is speed-changed in the manners described above, there is fixed an output gear G18 for transmitting power to the front wheels 6. Further, a front wheel driving transmission shaft 23 is supported between and through the front case 3*f* and the mid case 3*m*, so that power taken off this front wheel driving transmission shaft 23 is transmitted to the front axle case 7 via an unillustrated front wheel transmission structure. At a rear end of the front wheel driving transmission shaft 23, there is splined a shift gear G19. In operation, when this shift gear G19 is shifted forwardly to be meshed with the output gear G18 of the bevel pinion shaft 22, there is provided a four-wheel driving mode wherein a front wheel driving power of a speed synchronized with a rear wheel driving speed is taken off the front wheel driving transmission shaft 23. Whereas, when the shift gear G19 is shifted rearwardly to be released from the meshing with the output gear G18, there is provided a rear two-wheel driving mode wherein only the rear wheels 8 are driven while the driving of the front wheels 6 is stopped.

Next, the PTO transmission line will be described.

The rear end of the input shaft 18 supported through the upper portion of the front case 3*f* and a PTO transmission shaft 25 supported between and across the front case 3*f* and the mid case 3*m* are arranged in coaxial abutment to each other. And, via a one-way clutch 26 and a PTO clutch 27 provided at this abutment portion, the input shaft 18 and the PTO transmission shaft 25 are operatively coupled with each other. To the rear end of the PTO transmission shaft 25, a relay transmission shaft 28 is connected coaxially. And, a small gear G20 mounted at the rear end portion of this relay transmission shaft 28 is meshed with a large gear G21 mounted on the rear PTO shaft 12, so that the rear PTO shaft 12 can be driven at a constant speed, independently of the traveling line.

Figure 4:
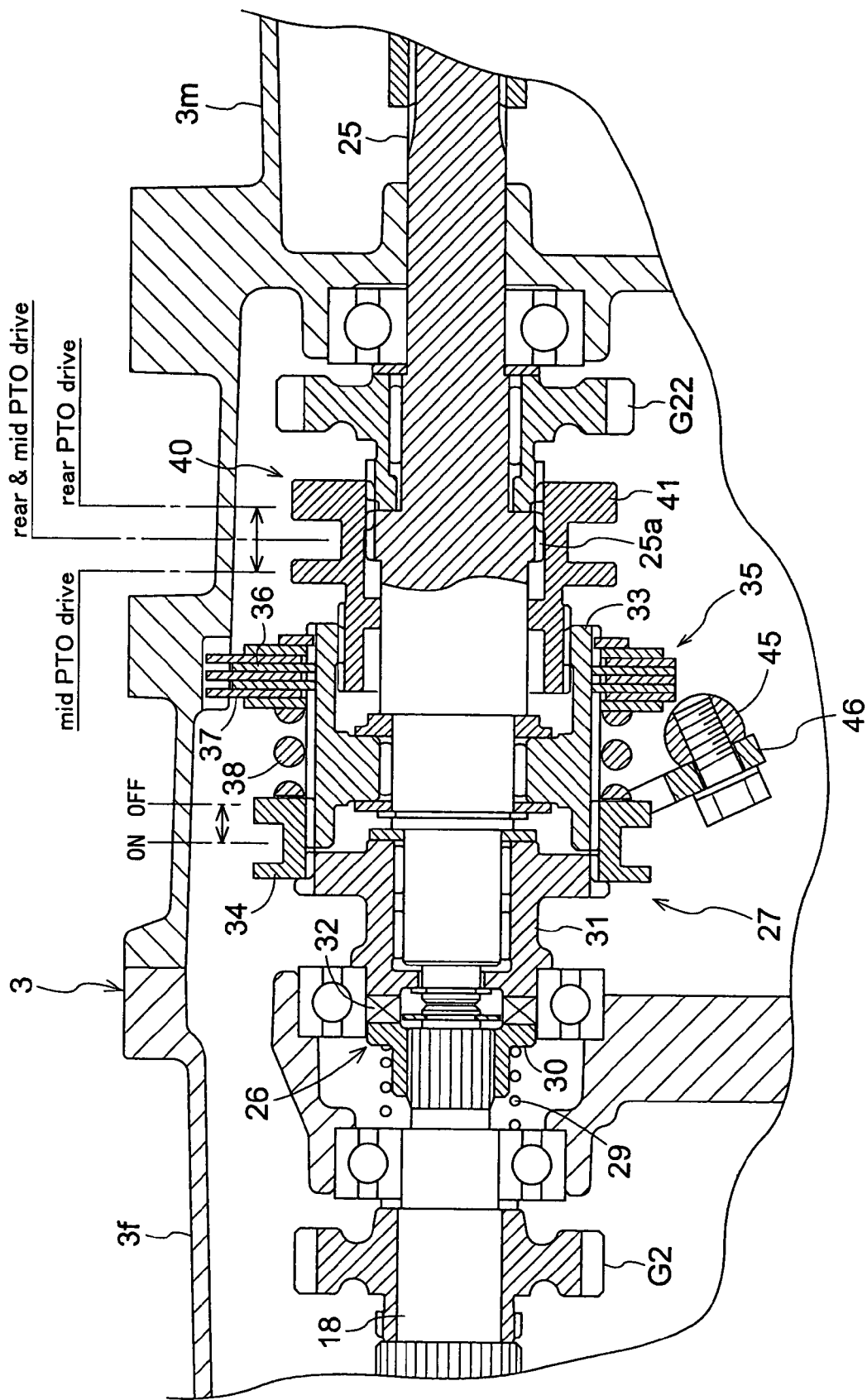
FIG. 4 is a side view in vertical section showing a PTO clutch under a clutch engaged condition.
Figure 5:
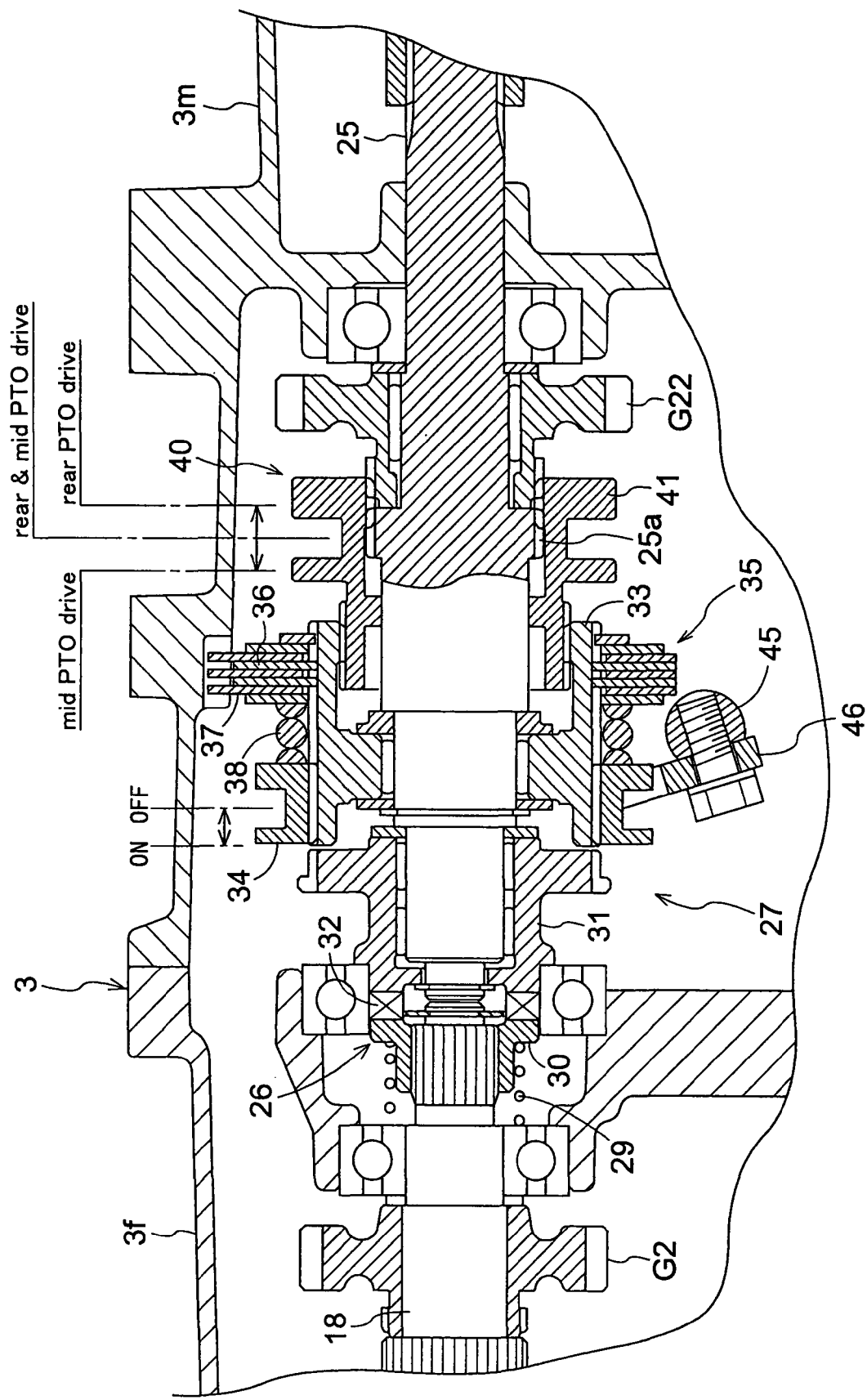
FIG. 5 is a side view in vertical section showing the PTO clutch under a clutch disengaged condition.
Figure 6:
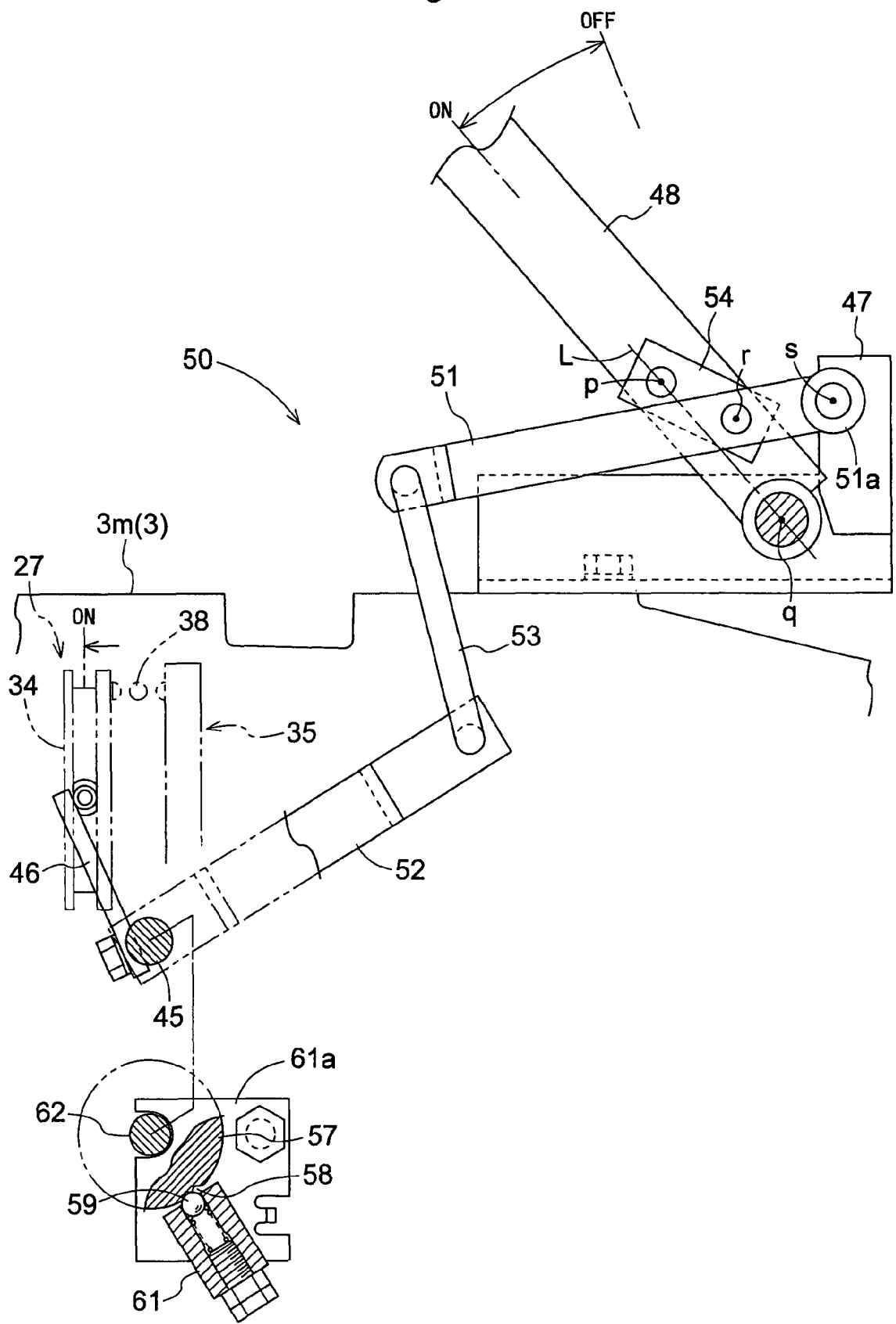
FIG. 6 is a side view showing a PTO clutch operating construction under the clutch engaged condition.

As shown in FIG. 4, the one-way clutch 26 includes a driving side clutch member 30 which is splined on a rear end portion of the input shaft 18 to be slidable in the fore and aft direction and slidably urged rearward by a spring 29 and a driven side transmission member 31 loosely fitted on a front end portion of the PTO transmission shaft 25 to be immovably axially. The clutch member 30 and the transmission member 31 are meshed and operatively coupled with each other via an inclined pawl engaging portion 32 provided adjacent mutually abutting ends of the members 30, 31. The inclined pawl engaging portion 32 is provided with a pawl inclination direction set such that the driven side transmission member 31 may forcibly push forward the clutch member 30 against the spring 29, while the transmission member 31 is allowed to rotate ahead of, i.e. preceding the rotation of, the clutch member 30 in the input shaft rotational direction. With this, it is possible to prevent the input shaft 18 from being rotated by reverse drive from the PTO transmission line. More particularly, when an implement having a large rotational inertia is rotatably driven by a PTO drive force, even if the main clutch is disengaged to stop vehicle travel and power transmission to the PTO transmission line is stopped, the input shaft 18 tends to be still driven by the rotational inertia of the implement, so that the vehicle may keep traveling inadvertently. The above-described arrangement effectively precludes this possibility.

As also shown in FIG. 4, the PTO clutch 27 is comprised of a meshing clutch consisting essentially of the transmission member 31 disposed on the driven side of the one-way clutch 26, a transmission collar 33 loosely supported on the PTO transmission shaft 25 and a clutch member 34 splined on this transmission collar 33 to be slidable back and forth. In operation, when the clutch member 34 is slid forwardly to be engaged with and across the transmission member 31 and the transmission collar 33, there is provided a "clutch engaged" condition for transmitting power from the transmission member 31 to the transmission collar 33. Whereas, when the clutch member 34 is slid rearwardly to be released from the transmission member 31, there is provided a "clutch disengaged" condition for interrupting the power transmission from the transmission member 31 to the transmission collar 33.

At a rear portion of the PTO clutch 27, there is disposed a PTO brake 35 operable to prevent inertial rotation of the transmission downstream side, in association with a "clutch disengaging" operation. The PTO brake 35 has a braking position and a non-braking position. This PTO brake 35 is constructed as a multi-disc friction brake having friction discs 36 splined on the transmission collar 33 and braking discs 37 non-rotatably engaged with a peripheral wall of the mid case 3*m*, with the discs 36 and 37 being superposed in alternation each other. Between the clutch member 34 of the PTO clutch 27 and the PTO brake 35, there is interposed a coil spring 38. Under the "clutch engaged" condition with the clutch member 34 slid forwardly, the coil spring 38 has a non-compressed, free length, when the PTO brake 35 is not activated for braking (non-braking position). Under the "clutch disengaged" condition with the clutch member 34 slid rearwardly, the displacement of the clutch member 34 is transmitted via the coil spring 38 to the PTO brake 35, so that the friction discs 36 and the braking discs 37 will be pressed against each other, thus applying a rotation braking force to the transmission collar 33.

Rearwardly of the PTO brake 35, there is provided a PTO mode selecting mechanism 40 capable of selectively providing a transmission mode in which the PTO power transmitted to the transmission collar 33 is transmitted only to the rear PTO shaft 12, a further transmission mode in which the PTO power is transmitted only to the mid PTO shaft 13, and a still further transmission mode in which the PTO power is transmitted both to the rear PTO shaft 12 and the mid PTO shaft 13.

The mid PTO shaft 13 is supported to a PTO case 3c joined to the lower face of the mid case 3m, so that the PTO power taken off an output gear G22 loosely mounted on a rear portion of the PTO transmission shaft 25 is gear-transmitted to the mid PTO shaft 13. More particularly, the output gear G22 is operably meshed with a gear G24 loosely mounted on the traveling transmission shaft 21 via a gear G23 loosely mounted on the front wheel driving transmission shaft 23, and a gear G25 formed integral with this gear 24 is operably meshed with a gear G27 formed integral on the mid PTO shaft 13 via a gear G26 loosely mounted on an intermediate support shaft 39.

The above-described PTO mode selecting mechanism 40 is configured to selectively provide the PTO modes by shifting, back and forth, a shift member 41 splined with an inner periphery of the transmission collar 33. In operation, when the shift member 41 is shifted to a forward most position, the shift member 41 is meshed, in its inner periphery, with only a spline portion 25a of the PTO transmission shaft 25, so that the power transmitted to the transmission collar 33 via the PTO clutch 27 is transmitted via the relay transmission shaft 28 to the rear PTO shaft 12 alone.

As shown in FIG. 4, when the shift member 41 is shifted to a fore-and-aft intermediate position, the shift member 41 is spline-engaged with the spline portion 25a of the PTO transmission shaft 25 and also with a boss portion of the output gear G22, so that the power transmitted to the transmission collar 33 via the PTO clutch 27 is transmitted to both the rear PTO shaft 12 and the mid PTO shaft 13.

When the shift member 41 is shifted to a rear most position, the shift member 41 is spline-engaged with only the boss portion of the output gear G22, so that the power transmitted to the transmission collar 33 via the PTO clutch 27 is transmitted to the mid PTO shaft 13 alone.

FIGS. 6 through 9 show an operating structure for the PTO clutch 27.

The clutch member 34 of the PTO clutch 27 is engaged with a shift fork 46 pivotally attached to a lateral wall of the mid case 3m via a fork shaft 45. An outer end portion of this fork shaft 45 is operatively coupled, via a link mechanism 50, with a clutch lever (an example of "clutch control") 48 disposed erect on a side of a driving section to be pivotable back and forth via a support bracket 47.

The link mechanism 50 consists essentially of an operational arm 51 pivotally connected to the support bracket 47, a clutch arm 52 fixedly connected to an outer end of the fork shaft 45, a link rod 53 interconnecting a free end of the operational arm 51 and a free end of the clutch arm 52, and a toggle link 54 operably coupling the clutch lever 48 with the operational arm 51. In operation, when the clutch lever 48 is operated to a clutch engaging position (ON) provided forwardly, the clutch member 34 is shifted forwardly, thus providing the "clutch engaged" condition. Whereas, when the clutch lever 48 is shifted to a clutch disengaging position (OFF) provided rearwardly, the clutch member 34 is shifted rearwardly, thus providing the "clutch disengaged" condition as well as a braked condition of the PTO brake 35.

The toggle link 54 has a function as "control retaining means" for switchably moving the clutch lever 48 across a dead point between the clutch engaging position (ON) and the clutch disengaging position (OFF). More particularly, when the clutch lever 48 is operated rearward from the clutch engaging position (ON), an upper pivot (p) of the toggle link 54 is displaced rearward along an arcuate path extending around a pivot axis (q) of the clutch lever 48, whereas a lower pivot (r) of the toggle link 54 is displaced downward along an arcuate path extending around a pivot axis (s) of the operational arm 51, whereby the operational arm 51 is pivoted downward and the clutch member 34 is progressively moved rearward (clutch disengaging direction).

Figure 7:
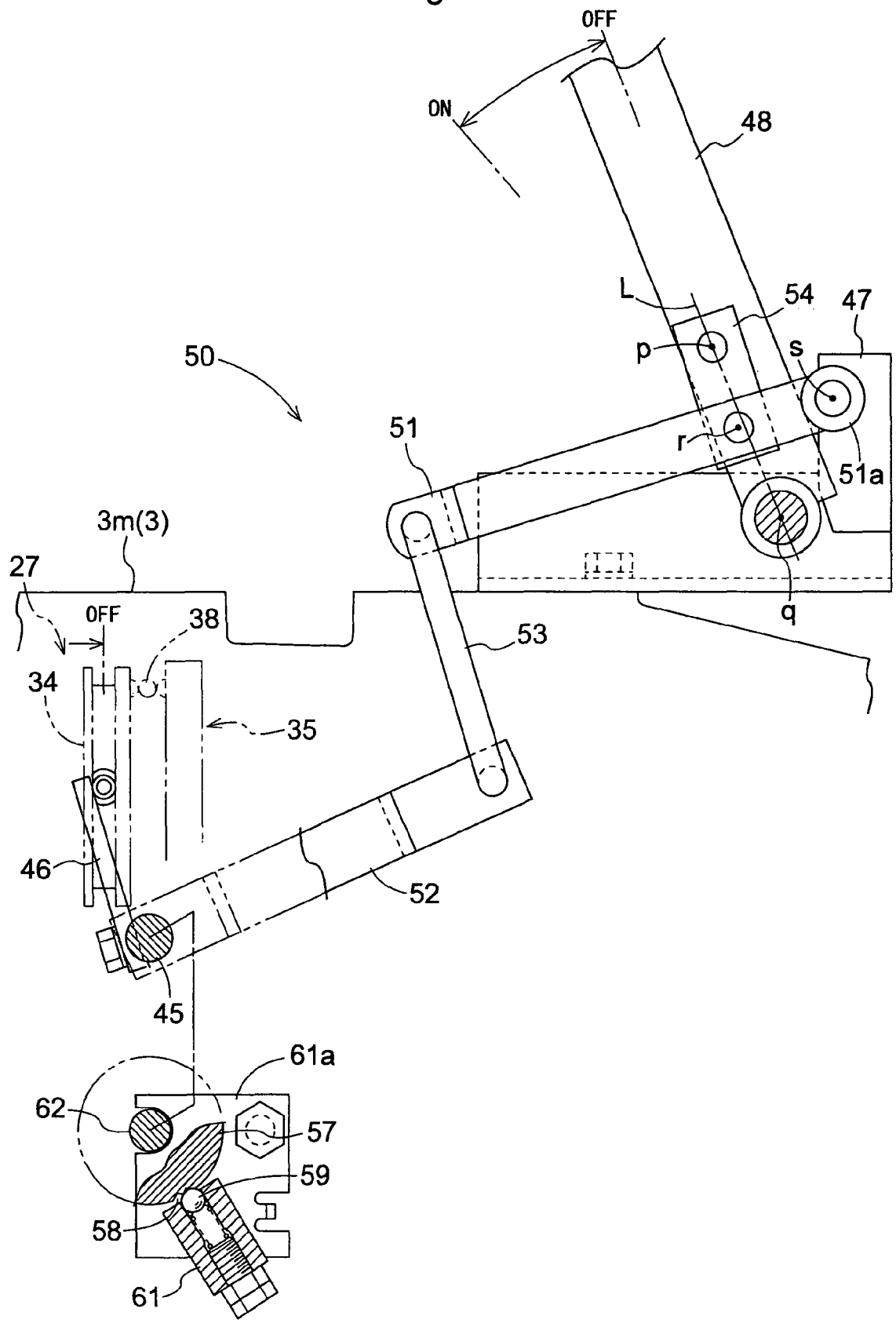
FIG. 7 is a side view showing the PTO clutch operating construction under the clutch disengaged condition.
Figure 8:
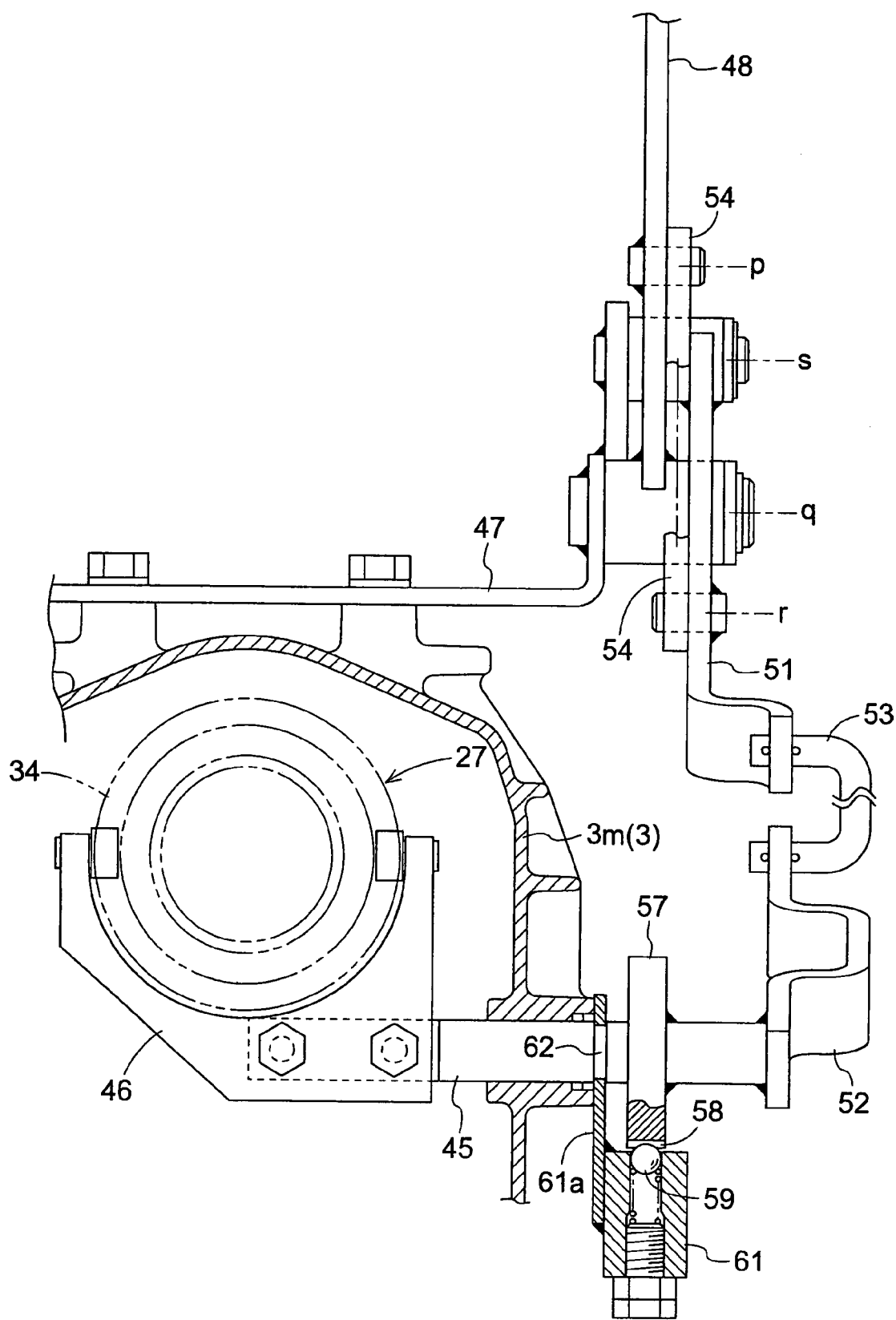
FIG. 8 is a front view in vertical section showing the PTO clutch operating construction.

When the lower pivot (r) of the toggle link 54 has reached a virtual line (dead point) L connecting the upper pivot (p) of the toggle link 54 with the pivot axis (q) of the clutch lever 48, the operational arm 51 assumes its most downwardly pivoted condition, when the PTO clutch 27 is disengaged completely and the PTO brake 35 is under the braking condition via the compressed coil spring 38. As the clutch lever 48 is pivoted further rearward to reach an operation limit position contacting a base end boss 51a of the operational arm 51, as shown in FIG. 7, the lower pivot (r) of the toggle link 54 has slightly passed forwardly the virtual line L connecting between the upper pivot (p) of the toggle link 54 and the pivot axis (q) of the clutch lever 48. Under this condition, due to the elastic resilience from the compressed coil spring 38, the clutch member 34 is slidably urged forward. With this forwardly urging force applied to the clutch member 34, the clutch arm 52 is pivotally urged upward and the operational arm 51 operably connected to this clutch arm 52 is also pivotally urged upward. With this, the lower pivot (r) of the toggle link 54 is pushed upward, forwardly of the dead point L. So that, the clutch lever 48 is pivotally urged rearward, whereby the clutch lever 48 is retained at the clutch disengaging position (OFF).

Incidentally, the support bracket 47 mounts a limit switch 56 for detecting the operational arm 51 having been operated downward and located presently at the clutch disengaging position. And, this limit switch 56 is connected to an engine starting circuit so as to allow start of the engine 1 only when the limit switch 56 is detecting disengagement of the PTO clutch 27.

To an outward projecting portion of the fork shaft 45, a disc 57 is fixedly attached. And, there is provided a detent mechanism 60 for engaging a spring-biased detent ball 59 within a notch 58 formed in an outer periphery of the disc 57. This detent mechanism 60 is activated for the engagement when the clutch member 34 is located at the clutch engaging position, thus retaining the clutch engaged condition stably. Incidentally, a base plate 61a of a holder 61 supporting the detent ball 59 is engaged with an outer peripheral groove 62 of the fork shaft 45, so that this plate is utilized as an anti-withdrawal member for the fork shaft 45.

Other Embodiments (1) In the foregoing embodiment, the link mechanism for operably coupling the clutch lever (clutch control) 48 with the fork shaft 45 incorporates therein the control retaining means for switchably moving the clutch lever 48 across the dead point L between the clutch engaging position (ON) and the clutch disengaging position (OFF). Alternatively, the clutch lever 48 and the fork shaft 45 may be operatively coupled via a simple link mechanism and the clutch lever 48 may be retained in position by a dedicated control retaining means.

Figure 9:
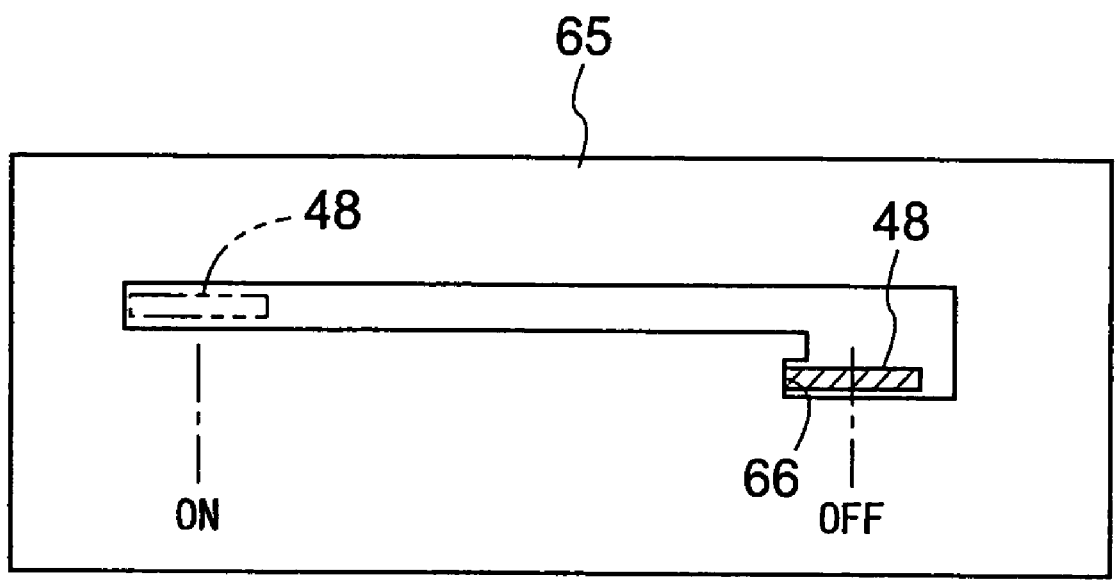
FIG. 9 is a plan view showing a further embodiment of an control retaining means included in the PTO clutch operating construction.

(2) As shown in FIG. 9, as a simple modified control retaining means, the clutch lever (clutch control) 48 may be configured to be operable or deformable in a lateral direction normal to the pivot operating direction, and the clutch lever 48 may be retained in a recess 66 defined in the lever guide 65, thus being retained at the clutch disengaging position (OFF).

(3) Further, the control retaining means can be formed with utilizing a curved toggle link 54 for passing a dead point.

(4) The PTO operating tool for operating the PTO clutch 27 and the PTO brake 35 can alternatively utilize a PTO pedal which can be foot-operated forwardly and reversely.

What is claimed is:

1. A PTO clutch for a work vehicle and an operating structure for the PTO clutch, comprising:
    a PTO clutch having a clutch member and transmitting/interrupting drive power from an engine;
    a clutch control manually operating the PTO clutch via the clutch member;
    a link mechanism mechanically and operatively coupling the clutch member and the clutch control to each other;
    a PTO brake disposed downstream of the PTO clutch with respect to a direction in which power is transmitted, the PTO brake being movable to a braking position in association with a clutch disengaging operation of the clutch member; and
    control retaining means for retaining the clutch control at a clutch disengaging position;
    wherein the clutch control is urged by the control retaining means, across a dead point, in a direction toward a clutch engaging position and in a direction toward a clutch disengaging position, respectively.

2. The PTO clutch and its operating structure according to claim 1, wherein said link mechanism includes a support bracket pivotally supporting the clutch control, an operational arm pivotally connected to the support bracket, and a toggle link operatively coupling the clutch control and the operational arm to each other; and
    wherein said toggle link forms said control retaining means.

3. The PTO clutch and its operating structure according to claim 1, wherein said PTO brake is fixed integrally to said PTO clutch; and said PTO brake is urged in a direction toward a braking position, by a spring interposed between said clutch member and said PTO brake.

4. The PTO clutch and its operating structure according to claim 3, further comprising a PTO mode selecting mechanism provided downstream of said PTO brake with respect to the power transmitting direction, said PTO mode selecting mechanism being capable of selectively providing a first transmission mode for transmitting PTO power only to a rear PTO shaft, a second transmission mode for transmitting the PTO power only to a mid PTO shaft and a third transmission mode for transmitting the PTO power to both the rear PTO shaft and the mid PTO shaft.

5. The PTO clutch and its operating structure according to claim 1, wherein said control retaining means is incorporated within said link mechanism.

6. The PTO clutch and its operating structure according to claim 1, further comprising:
    a rear PTO shaft projecting at a rear portion of a vehicle body and a mid PTO shaft projecting at a lower portion of the vehicle body, both on a downstream side of said PTO brake in the power transmitting direction.

7. The PTO clutch and its operating structure according to claim 1, further comprising a one-way clutch, disposed at a position upstream of said PTO clutch, for allowing advance rotation of a portion of transmission downstream with respect to the one-way clutch.

* * * * *